United States Patent

[11] 3,609,492

| [72] | Inventor | Rodney G. Rakes<br>Bristol, Tenn. |
|---|---|---|
| [21] | Appl. No. | 55,793 |
| [22] | Filed | July 17, 1970 |
| [45] | Patented | Sept. 28, 1971 |
| [73] | Assignee | Sperry Rand Corporation |

[54] REVERSIBLE BRUSHLESS DC MOTOR
3 Claims, 2 Drawing Figs.

[52] U.S. Cl. .................................................... 318/254, 318/290
[51] Int. Cl. .................................................... H02k 29/00
[50] Field of Search .......................................... 318/138, 254, 696, 685, 290

[56] References Cited
UNITED STATES PATENTS

| 3,364,407 | 1/1968 | Hill | 318/138 |
|---|---|---|---|
| 3,377,534 | 4/1968 | Hill | 318/138 |
| 3,412,303 | 11/1968 | Rakes | 318/138 |
| 3,418,550 | 12/1968 | Kolatorowicz et al. | 318/138 |
| 3,483,458 | 12/1969 | Kirk | 318/138 |
| 3,529,220 | 9/1970 | Kobayashi et al. | 318/254 |

Primary Examiner—G. R. Simmons
Attorney—S. C. Yeaton

ABSTRACT: An optically commutated brushless DC motor contains a multijunction closed-loop stator winding. Each junction is energized through separate switching circuits in response to illumination of a corresponding photocell. Each photocell may be coupled to either one of two switching circuits through a gate in one or the other of two groups of gates. A directional control circuit disables both groups of gates in the absence of a command signal but enables one or the other group of gates in response to a clockwise or counterclockwise command signal, respectively. The directional control circuit further contains feedback means that prevents the circuit from responding to a reverse command signal until the termination of a previously applied command signal.

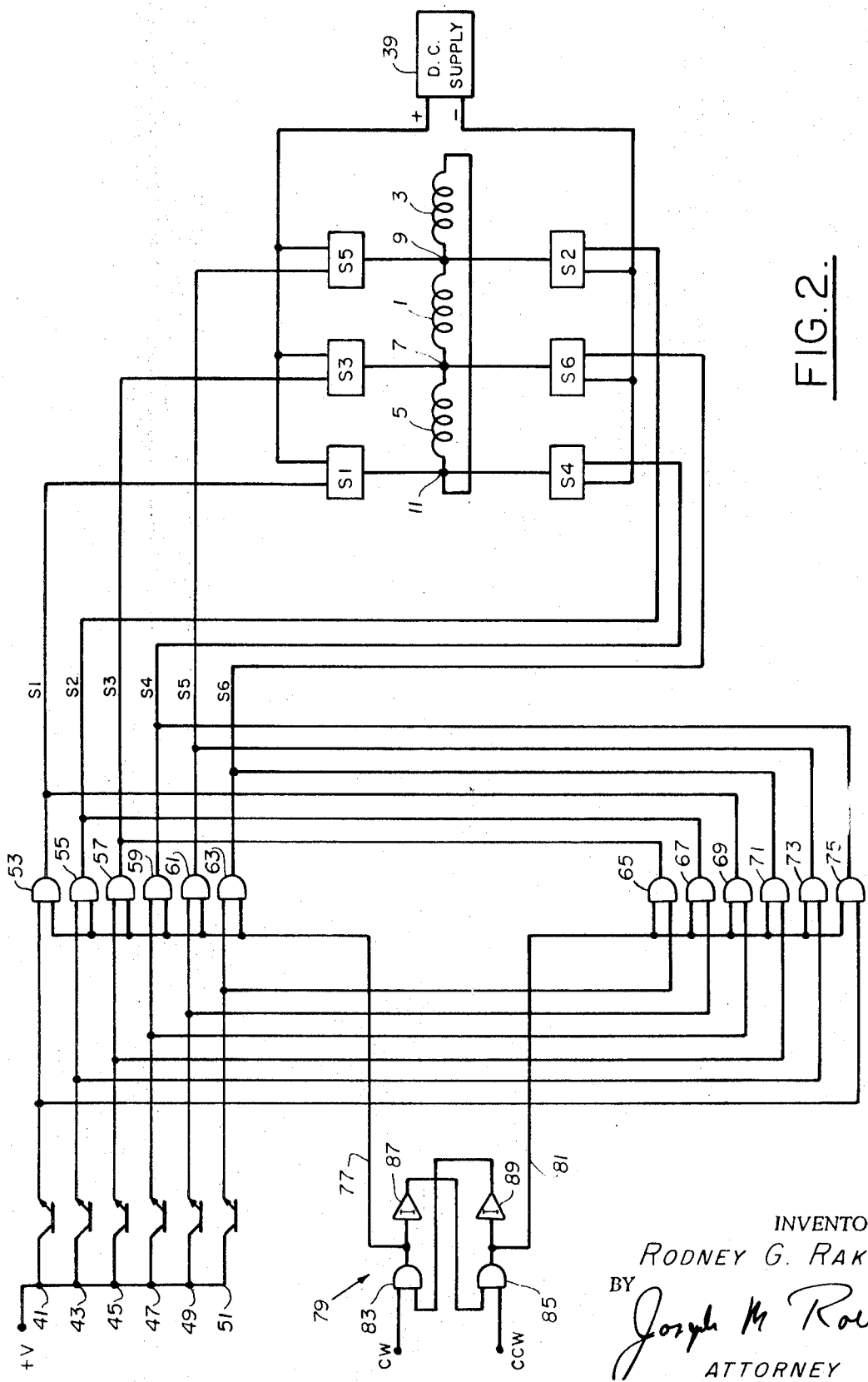

3,609,492

REVERSIBLE BRUSHLESS DC MOTOR

BACKGROUND OF THE INVENTION

1. Field of the Invention

This invention relates to brushless DC motors (BDCM's) and more specifically to reversible BDCM's employing a single set of rotor position sensors.

2. Description of the Prior Art

Reversible BDCM's are known in the prior art. Some of these prior art motors employ two sets of rotor position sensors. Thus optically commutated BDCM's have been constructed in which a first set of photosensors is used to provide rotation in one direction and a second set of photosensors is used to provide rotation in the opposite direction. Such duplication of circuits contributes to the complexity and maintenance problems of the motor.

Another approach to the reversibility problem utilizes a single set of position sensors but electrically switches these sensors so as to effectively rotate the sensors by 180° in order to achieve reversal of rotor rotation. These prior art motors, however, are susceptible to damage in that clockwise and counterclockwise signals can be simultaneously applied to the switching circuits and thus cause abnormally high currents in the motor.

SUMMARY OF THE INVENTION

An optically commutated reversible BDCM contains a single set of position sensors and gating means to couple successive photosensors to corresponding junctions on the stator windings for one direction of rotor rotation and to a different set of corresponding junctions for the opposite direction of rotor rotation. Damage to the motor is prevented by means of a directional control logic circuit which prohibits the flow of a directional command signal in the presence of an existing command signal for the opposite direction of rotation.

DESCRIPTION OF THE DRAWINGS

FIG. 2 is a schematic diagram of the circuit of the invention that may be used with a motor of the type illustrated in FIG. 1.

DESCRIPTION OF THE PRESENTLY PREFERRED EMBODIMENT

Figure 1:
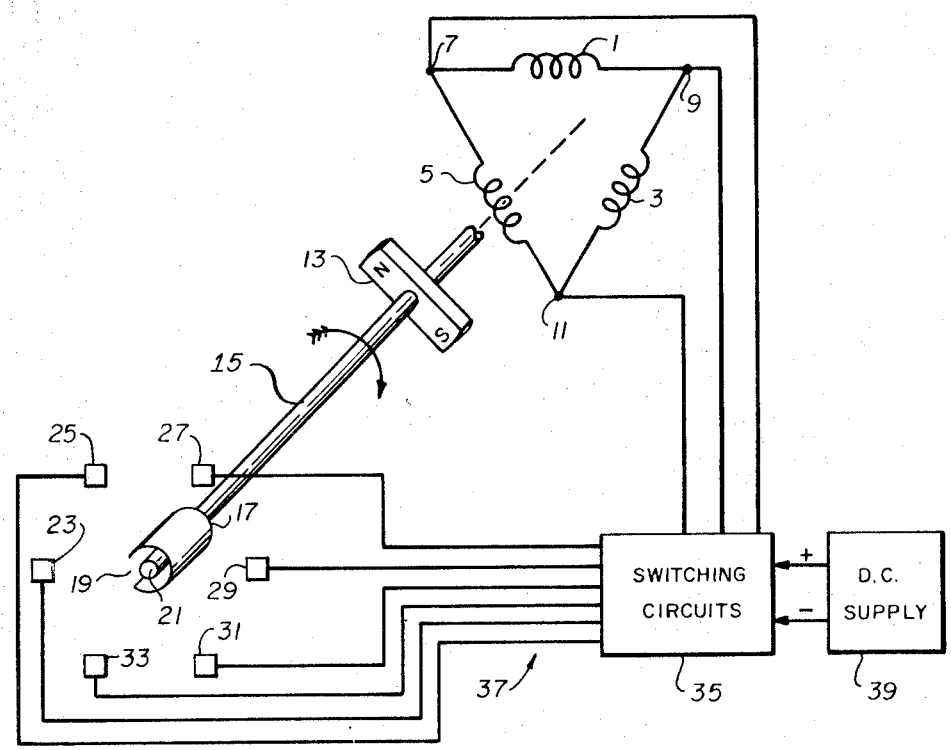
FIG. 1 is a diagram, partly in perspective, illustrating a type of motor to which the invention may be applied.

U.S. Pat. No. 3,377,534 issued to R. K. Hill on Apr. 9, 1968, and assigned to the present assignee describes a BDCM in which pairs of photosensors are used to connect junction points on a closed-loop stator winding to the two terminals of a power supply. In common with the motor of the Hill patent, the present invention may utilize a closed-loop stator winding of the type illustrated in FIG. 1. The rotor winding, for instance, may be a delta winding containing coil portions 1, 3 and 5 joined together at junction points or taps 7, 9 and 11, respectively. A permanent magnet rotor 13 is mounted on a shaft 15. A light shield 17 mounted on the same shaft contains a slotlike aperture 19 which permits light from a source 21 to illuminate photosensors 23, 25, 27, 29, 31 and 33 arranged annularly around the light source. The aperture 19 is sufficiently wide so that when the center of the light beam is focused directly on a given photosensor, the two adjacent photosensors will also be illuminated. At least two adjacent photosensors are always illuminated.

The switching signals from the photosensors are fed to appropriate switching circuits 35 through individual feed lines 37. The switching circuits respond to the switching signals from the photosensors to apply voltages from a DC supply 39 to the various junction points.

The switching circuits operate to connect appropriate junction points to either the positive or negative side of the DC supply in response to switching signals from the photosensors. Each pair of diametrically opposite photosensors control a given junction point. For example, if the photosensor 23 serves to connect the junction point 7 to the positive side of the DC supply when the photosensor is illuminated, the photosensor 29 would serve to connect the junction point 7 to the negative side of the DC supply 39 when this photosensor is illuminated.

The switching circuits are arranged to energize the various stator winding coils so that a rotating magnetic field is established in response to successive illumination of the various photosensors. Thus, for example, if at one position of the rotor the junction point 11 were connected to the positive side of the DC supply and the junction points 7 and 9 were connected to the negative side of the DC supply, the resultant current flow through the coils 3 and 5 might provide magnetic fields having a resultant that is directed vertically upward. As the rotor rotates in a clockwise direction, the illumination on the photosensors changes until the junction point 7 is disconnected by the switching circuits while the junction points 11 and 9 remain connected to the positive and negative sides of the DC supply, respectively. A first current now flows through the coil 3 and a second current flows serially through the coils 5 and 1. This effectively advances the resultant magnetic field by an angle of 30° in the clockwise direction so as to maintain rotor rotation. Rotation of the rotor continues as successive junction points are connected to appropriate sides of the DC supply.

The photosensors and the aperture in the light shield are positioned so as to energize combinations of stator winding coils that will provide a resultant magnetic field, which leads the rotor. In other words, for clockwise rotation the resultant magnetic field always has a diametrical direction that is displaced clockwise from the north-south axis of the rotor; for counterclockwise rotation this displacement is always counterclockwise.

The components of FIG. 2, exclusive of the photosensors, directional control means, stator winding and DC supply, would normally be included in the switching means 35 of FIG. 1.

The stator winding, comprising the coil portions 1, 3 and 5, joined at the junction points 7, 9 and 11, corresponds to the coil portions and junction points shown in FIG. 1.

A first group of switch sections S1, S3 and S5 permits individual junction points to be connected to the positive side of the DC supply whereas a second group of switch sections S2, S4 and S6 permits individual junction points to be connected to the negative side of the DC supply.

The switch sections S1–S6 ordinarily would consist of transistor amplifying means driving a transistor switch and may be of a type shown in the aforementioned Hill patent. Photosensors 41, 43, 45, 47, 49 and 51 are energized from a suitable source of voltage. A switching signal may be derived from any of the photosensors in response to radiation from the light source. The switching signal is applied from the photosensors to corresponding AND gates 53, 55, 57, 59, 61 or 63 in a first group of gates and to the gates 65, 67, 69, 71, 73 or 75 comprising a second group of AND gates. The gates in the first group may be enabled by means of an enabling signal on a line 77 from a direction control circuit 79. Similarly, the gates in the second group may be enabled by a signal from the direction control circuit through a line 81.

The signals applied to the first group of gates from the photosensors may pass directly to a corresponding sequence of switches. Signals from the second group of gates, however, are applied to the corresponding switches in a different sequence.

Assume, for instance, that clockwise direction of rotation is desired and that this will cause the photosensors to be illuminated in ascending order, i.e. photosensor 41 will be illuminated first and photosensor 51 will be illuminated last. Switch section S1 will then be closed first and S6 will be closed last.

For counterclockwise rotation, however, the second group of gates will be enabled and the photosensors will be illuminated in a descending order. Assuming photosensor 51 is illuminated first, the switches would be closed in the order: S3, S2, S1, S6, S5 and S4. Thus switching signals applied through the first group of gates will provide rotation in the opposite direction.

The direction control means 79 contains first and second coincidence gates 83 and 85 feeding inverter circuits 87 and 89, respectively. The output signal from either inverter circuit is fed back through a cross-coupled circuit to the input of the opposite coincidence gate. Thus if a clockwise command signal is applied to the gate 83, the gate 83 will not be able to pass this signal to the line 77 unless the gate 85 is closed so that inverter 89 provides a low-level signal.

Assume, for example, that a clockwise signal is being applied to the gate 83 and that an enabling signal appears on the line 77 so as to enable the gates in the first group. The inverter circuit 87 in this case will provide a low-level signal to the gate 85. If, now, a counterclockwise command signal is inadvertently applied to the gate 85, this command signal will be prevented from reaching the line 81 since the gate 85 will be closed under these conditions.

In the event that no signal is applied to either the clockwise or counterclockwise input terminal, each of the gates 83 and 85 will be receiving a high-level signal from the inverter circuits 89 or 87, respectively. The first signal applied to either of the clockwise or counterclockwise input terminals will then be effective to enable the gates in the corresponding group and to disable the opposite AND gate in the direction control circuit.

Because the direction control circuit prevents a directional command signal from passing to the switching circuits during the existence of a previously applied command signal, the direction control circuit assures that only one directional command signal can be applied to the motor at any given time. Because of this feature, a motor employing the principles of the present invention cannot be damaged by the inadvertent application of a second command signal.

It will be appreciated that although optical sensing means have been described for use with the invention, well-known variants of the optical system may be substituted for those described herein. In general, any radiation source may be used together with a directing means and radiation sensitive elements responsive to that source.

Similarly, although the invention has been described in connection with a particular type of motor described in the aforementioned Hill patent, a wide variety of known types of BDCM's may be used in connection with the directional control means of the invention. In particular, it should be noted that the principles of the invention are not limited to a delta winding. The invention may be applied to motors utilizing a ring winding having any suitable number of coil portions or to a motor employing a star winding if so desired.

The circuit of the invention is so designed that it readily lends itself to integrated circuit logic elements if desired.

The circuit of the invention is so designed that it readily lends itself to integrated circuit logic elements if desired. The use of such logic elements is frequently beneficial in situations in which the motor must be limited in size or weight.

While the invention has been described in its preferred embodiment, it is to be understood that the words which have been used are words of description rather than limitation and that changes may be made within the purview of the appended claims without departing from the true scope and spirit of the invention in its broader aspects.

1. A reversible brushless DC motor comprising a multijunction closed loop stator winding, a permanently magnetized rotor having a north-south axis and being rotatable in response to magnetic fields established by said winding, a DC supply having positive and negative output terminals, a plurality of switching sections for connecting individual junctions of said winding to either terminal of said DC supply whereby current flow through selected portions of said winding may be provided so as to establish a magnetic field in a variety of diametrical directions, means to provide a beam of radiation that rotates in synchronism with said rotor, a plurality of sensors positioned to be sequentially irradiated by said beam of radiation during rotation of said rotor, first and second groups of gating elements for coupling switching signals from each sensing element to a different one of said switching sections, said first and second groups of gating elements being connected to switching sections that provide a magnetic field having a diametrical direction that is displaced clockwise and counterclockwise, respectively, from the north-south axis of said rotor, direction control means for enabling either one of said groups of gating elements, said direction control means including first and second coincidence gates for receiving clockwise and counterclockwise command signals respectively, said first and second coincidence gates further including output means coupled to said first and second groups of gating elements respectively, each of said coincidence gates further including an enabling terminal, said direction control means further including first and second inverter circuits coupled to receive output signals from said first and second coincidence gates respectively, each of said inverter circuits being further cross-coupled to provide a feedback signal to the enabling terminal of the opposite coincidence gate, whereby either one of said groups of gating elements is maintained in a disabled condition while the other of said groups of gating elements is enabled.

2. The motor of claim 1 wherein said plurality of switching sections includes first and second groups of switching sections for connecting individual junctions of said winding to the positive and negative terminals of said DC supply respectively, each of said groups of switching sections containing a separate switching section for each junction on the winding, said motor being further characterized in that adjacent sensors may be coupled through either group of gating elements to pairs of switching sections, each of said pairs having a switching section in each group of switching sections.

3. A reversible brushless DC motor comprising a DC supply having positive and negative terminals, a torque-producing unit including a rotor and a stator, switching means operatively connected to said stator for controlling energization thereof, said stator having a main winding means including a plurality of coil portions joined to said switching means at a plurality of junction points in a closed loop circuit, said switching means including a first and a second group of sections, each of said junction points being connectable to said positive terminal through an individual section of said first group and to said negative terminal through an individual section of said second group, rotor position sensing means for detecting the instantaneous position of the rotor, said position sensing means including a radiation-producing source, and directing means for controlling radiation emanating from said source, said position sensing means further including a plurality of radiation-sensitive elements equal in number to the total number of said sections, said elements being arranged to produce a switching signal in response to radiation from said source, said directing means including a portion mounted for rotation by said rotor and constructed to irradiate selected radiation-sensitive elements as a function of rotor position and in a sequence determined by the direction of rotation of said rotor, first and second groups of gates, directional control means for selectively enabling either one of said groups of gates, said directional control means including first and second coincidence mans for receiving clockwise and counterclockwise command signals respectively, said first and second coincidence means further including output means coupled to said first and second groups of gates respectively, and enabling means for providing an output corresponding to a command signal only in the presence of an enabling signal, said directional control means further including first and second inverter means coupled to receive output signals from said first and second coincidence means respectively, and cross-coupled to provide inverted feedback signals to the enabling means of the opposite coincidence means, each of gates including individual gates connected to receive switching signals from corresponding ones of said radiation-sensitive elements, each of said gates having an output terminal connected to a different section of said switching means, said gates being arranged to pass a switching signal to the associated switching means section only when that gate is enabled, said switching means section being arranged to connect the associated junction and DC supply terminal in response to a switching signal, said junctions being spaced on said winding means so that a magnetic field having a resultant along a diameter is established by connecting a plurality of selected junctions across said supply terminals, the direction of said resultant being determined by the particular junctions so selected, the junctions to which the gates in the first group are connected being selected so that irradiation of said elements in a first sequence causes the resultant magnetic field to rotate in a first direction, the junction to which the gates in the second group are connected being selected so that irradiation of said elements in a second sequence causes the resultant magnetic field to rotate in a second direction.